US009501463B2

(12) United States Patent
Khen et al.

(10) Patent No.: US 9,501,463 B2
(45) Date of Patent: Nov. 22, 2016

(54) SPREADSHEET CELL-BASED NOTIFICATIONS

(75) Inventors: Dan Y. Khen, Bellevue, WA (US); Dan Battagin, Bellevue, WA (US); Eran Megiddo, Bellevue, WA (US); Liviu Asnash, Bellevue, WA (US); Scott Walter Bishel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1356 days.

(21) Appl. No.: 11/296,897

(22) Filed: Dec. 8, 2005

(65) Prior Publication Data

US 2007/0136666 A1    Jun. 14, 2007

(51) Int. Cl.
*G06F 17/00* (2006.01)
*G06F 17/24* (2006.01)
*G06Q 10/10* (2012.01)

(52) U.S. Cl.
CPC ............ *G06F 17/246* (2013.01); *G06Q 10/10* (2013.01)

(58) Field of Classification Search
CPC .................................................. G06F 17/246
USPC ........................................................ 715/217
See application file for complete search history.

(56) References Cited

U.S. PATENT DOCUMENTS

| 5,774,661 | A | * | 6/1998 | Chatterjee et al. ........... 709/203 |
| 5,883,623 | A | | 3/1999 | Cseri |
| 5,893,123 | A | * | 4/1999 | Tuinenga ...................... 715/209 |
| 5,983,268 | A | * | 11/1999 | Freivald et al. .............. 709/218 |
| 6,003,012 | A | | 12/1999 | Nick |
| 6,009,455 | A | | 12/1999 | Doyle ........................... 709/201 |
| 6,023,691 | A | | 2/2000 | Bertrand et al. |
| 6,157,934 | A | | 12/2000 | Khan et al. |

(Continued)

FOREIGN PATENT DOCUMENTS

| EP | 0351234 A2 | 1/1990 |
| EP | 0351243 A1 | 1/1990 |

(Continued)

OTHER PUBLICATIONS

Allard, Jérémie Allard, "Functional and Structural Recursion in Spreadsheet Languages", A Thesis, http://www-id.imag.fr/Laboratoire/Membres/Allard_Jeremie/files/msthesis-jeremie-allard.pdf, Aug. 2002, 59 pages.

(Continued)

*Primary Examiner* — Mustafa Amin
(74) *Attorney, Agent, or Firm* — Tom Wong; Micky Minhas

(57) ABSTRACT

A workflow includes an activity that takes advantage of spreadsheet calculations. For a spreadsheet activity, calculation and extraction of values from a spreadsheet is performed. Thus, spreadsheet calculations are integrated into workflows without user intervention. After the workflow is complete, or after a spreadsheet activity is calculated, or upon a threshold or condition being met, a user or system may be notified (e.g., by email, instant message, etc.). Values from previous activities in the workflow may be obtained and provided to the spreadsheet (e.g., cell values are set, modified, or adjusted). The spreadsheet may then be recalculated using these obtained values. Moreover, values from the spreadsheet may be used in subsequent parts of the workflow. Also, any number of spreadsheet activities may be incorporated into a workflow, and one spreadsheet activity may provide values to a second spreadsheet activity in the workflow.

15 Claims, 6 Drawing Sheets

(56) References Cited

U.S. PATENT DOCUMENTS

| | | | |
|---|---|---|---|
| 6,256,651 | B1 | 7/2001 | Tuli |
| 6,701,485 | B1 * | 3/2004 | Igra et al. ............... 715/210 |
| 7,069,536 | B2 * | 6/2006 | Yaung ..................... 717/102 |
| 7,426,688 | B2 * | 9/2008 | Serra et al. ............... 715/212 |
| 7,587,665 | B2 * | 9/2009 | Crow ............... G06Q 40/12 715/212 |
| 2002/0075270 | A1 * | 6/2002 | Alden ............. G06T 11/206 345/473 |
| 2002/0077842 | A1 * | 6/2002 | Charisius et al. ............ 705/1 |
| 2002/0078086 | A1 * | 6/2002 | Alden ............. G06F 17/246 715/213 |
| 2002/0178117 | A1 * | 11/2002 | Maguire et al. ............ 705/40 |
| 2003/0023622 | A1 * | 1/2003 | Obermeyer et al. ........ 707/500 |
| 2003/0036999 | A1 * | 2/2003 | Mirlas et al. ............ 705/40 |
| 2003/0058277 | A1 * | 3/2003 | Bowman-Amuah ........ 345/765 |
| 2003/0188259 | A1 | 10/2003 | Aureglia et al. ......... 715/503 |
| 2003/0195762 | A1 * | 10/2003 | Gleason et al. ............ 705/1 |
| 2003/0220707 | A1 * | 11/2003 | Budinger et al. ........... 700/97 |
| 2004/0044753 | A1 | 3/2004 | Toyoshima et al. ........ 709/223 |
| 2004/0064806 | A1 * | 4/2004 | Johnston-Watt et al. .... 717/124 |
| 2004/0088647 | A1 * | 5/2004 | Miller et al. ............ 715/500 |
| 2004/0103014 | A1 * | 5/2004 | Teegan et al. ............ 705/8 |
| 2004/0103365 | A1 | 5/2004 | Cox ..................... 715/503 |
| 2004/0128147 | A1 | 7/2004 | Vallinayagam et al. |
| 2005/0039114 | A1 | 2/2005 | Naimat et al. |
| 2005/0049906 | A1 | 3/2005 | Leymann et al. |
| 2005/0081141 | A1 * | 4/2005 | Jonsson ................. 715/503 |
| 2005/0086193 | A1 | 4/2005 | Bolstad et al. ............ 707/1 |
| 2005/0097146 | A1 | 5/2005 | Konstantinou et al. |
| 2005/0102185 | A1 * | 5/2005 | Barker et al. ............. 705/26 |
| 2005/0108052 | A1 | 5/2005 | Omaboe |
| 2005/0114760 | A1 * | 5/2005 | Arregui et al. ............ 715/513 |
| 2005/0149422 | A1 | 7/2005 | Van Lier ................. 705/36 |
| 2005/0149482 | A1 | 7/2005 | Dillon .................... 707/1 |
| 2005/0188352 | A1 | 8/2005 | Jager et al. ............. 717/106 |
| 2006/0111092 | A1 * | 5/2006 | Harris et al. ............ 455/418 |
| 2006/0168325 | A1 * | 7/2006 | Wood et al. ............. 709/238 |
| 2007/0067728 | A1 * | 3/2007 | Lo et al. ................ 715/751 |
| 2008/0163042 | A1 * | 7/2008 | Delargy ................. 715/217 |
| 2008/0256508 | A1 * | 10/2008 | Jonsson ................. 717/104 |
| 2009/0031206 | A1 * | 1/2009 | Aureglia et al. ............ 715/217 |
| 2009/0070158 | A1 * | 3/2009 | Virine et al. .............. 705/7 |

FOREIGN PATENT DOCUMENTS

| | | | |
|---|---|---|---|
| EP | 0351234 A3 * | 5/1992 | ........... B25J 9/1684 |
| KR | 2003-0051428 | 6/2003 | |
| WO | WO 2004/021202 A1 | 3/2004 | |
| WO | WO 2005/081126 A2 | 9/2005 | |

OTHER PUBLICATIONS

Riehle, D., "The Event Notification Pattern-Integrating Implicit Invocation with Object-Orientation", *Theory and Practice of Object Systems*, 1996, 2(1), 43-52, http://www.riehle.org/computer-science/research/1996/tapos-1996-event.pdf.

Tilton, K., "Cells Overeview", http://www.tilton-technology.com/cells-overview.pdf, 14 pages.

Dovico™ Software, "Investing in Better Time & Expense Gathering", Jun. 2005, http://www.dovico,com/documents/Investing-in-Better-Time-Expense- Gathering.pdf, 11 pages.

Entology, "Large Diversified Manufacturer Achieves Sarbanes-Oxley Compliance through Financial Document Management", http://www.entology.com/press/cs/cs_029.htm, 2003, 2 pages.

"WP01:WebSphere MQ Workflow-Performance Estimates and Capacity Assessments", http://www.1.ibm.com/support/docview.wss?rs=171&uid=swg24006573&loc=enUS&cs=ytu-8&lang=en, 2 pages.

Quixa, Builder/Quixa Solutions, http://www.quixa.com/ultimus/builder.asp, 2005, 4 pages.

* cited by examiner

SPREADSHEET CELL-BASED NOTIFICATIONS

BACKGROUND

Spreadsheet software, such as MICROSOFT's EXCEL software, operates to simulate paper spreadsheets, also sometimes called worksheets, or workbooks, in which columns of numbers are operated upon mathematically, e.g., summed, multiplied, etc., for budgets, plans, models, and other tasks. A typical spreadsheet software user interface appears on screen as a matrix of rows and columns, the intersections of which are called "cells." The cells can be filled with labels, numeric values, or formulas. Labels are descriptive text such as "Rent" and "Gross Sales." Values are the actual numeric data, and formulas command the spreadsheet to perform specific calculations based on the values; for example, the formula SUM CELLS A5 TO A10, may cause the spreadsheet software to sum the cells found at column A, rows 5 to 10. Formulas allow interrelationships of cells, and they are easy to create. For instance, one may merely point to a cell and click, and then press a key (+, -, etc.) of any arithmetic operation intended to affect the cell. For example, the creation of a formula might be "the contents of this cell PLUS the contents of this cell DIVIDED BY the contents of the next cell over to the left."

After numbers are added or changed, the formulas generally recalculate the data automatically or at the initiation of the user, e.g., with the press of a key. This can create a recalculation "ripple" effect throughout multiple cells. Since the contents of any cell can be calculated with or copied to any other cell, a total of one column can be used as a detail item in another column. For example, the total from a column of expense items can be carried over to a summary column showing all expenses. If the contents of a cell in the detail column changes, its column total changes, which is then copied to the summary column, and the summary total changes.

Such a ripple effect lets a user create a plan or model, plug in different assumptions about the model, i.e., change parameters, and immediately see the impact on the bottom line. This "what if?" capability makes the spreadsheet indispensable for budgets, plans, and other equation-based tasks. The "what if?" capability thus allows users to change underlying parameters, such as interest rate, of a mathematical model, such as growth of bank account over time. The "what if?" similarly allows a user to change underlying facts, such as starting bank account balance, the formulas interrelating the cells, such as calculating interest with or without a formula that compounds interest, and even the names of the cells to address different mathematical scenarios.

Thus, spreadsheets include business logic in the form of models and calculations, as well as data. A workflow is a set of relationships between the activities in a project, from start to finish. Activities are related by different types of trigger relation. Activities may be triggered by external events or by other activities. There are many business workflow scenarios that may be suited for calculation and extraction of values from database workbooks, such as MICROSOFT EXCEL workbooks. Workflow processes are often asynchronous to user intervention and thus need to work on server automated systems. Software driven workflows usually have the need to work asynchronously, without user intervention. Spreadsheet calculations have not been capable of being called in an automated workflow.

Moreover, significant critical data resides in spreadsheets today. This data may either be a result of calculations, queried from an external source, typed in, or combination of these. It is often desirable to track specific values in a spreadsheet over time and act based on changes in the values. Today this requires opening the spreadsheet periodically or keeping it open and refreshing the calculations to update any external data queries or volatile formulas and then visually checking the values of interest. If the values have not changed or have not met a threshold that would require action, the time the user spent opening and refreshing the spreadsheet is wasted. Moreover, even if the threshold is met, the user's time is wasted while waiting to refresh and calculate the spreadsheet. Attention is also a valuable resource that is wasted because the process requires periodic polling.

SUMMARY

A workflow includes an activity that takes advantage of spreadsheet calculations. For a spreadsheet activity, setting of values into a spreadsheet, calculation, and extraction of values from the spreadsheet is performed. Thus, spreadsheet calculations are integrated into workflows without user intervention. For example, spreadsheet calculations are called as a step in an automated workflow. The spreadsheet file is recalculated during the workflow. After the workflow is complete, or after a spreadsheet activity is calculated, or upon a trigger being activated or a threshold or condition being met, notification may be sent (e.g., notifying a user may by email, instant message, etc., or notifying a software system that may take action based on the notification). The notification may comprise content including a calculated workbook, a uniform resource locator (URL) of a workbook, a value of a cell that triggered the notification, and/or predetermined values.

Values from previous activities in the workflow may be obtained and provided to the spreadsheet (e.g., cell values are set, modified, or adjusted). The spreadsheet may then be recalculated using these obtained values. Moreover, values from the spreadsheet may be used in subsequent parts of the workflow. Also, any number of spreadsheet activities may be incorporated into a workflow, and one spreadsheet activity may provide values to a second spreadsheet activity in the workflow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
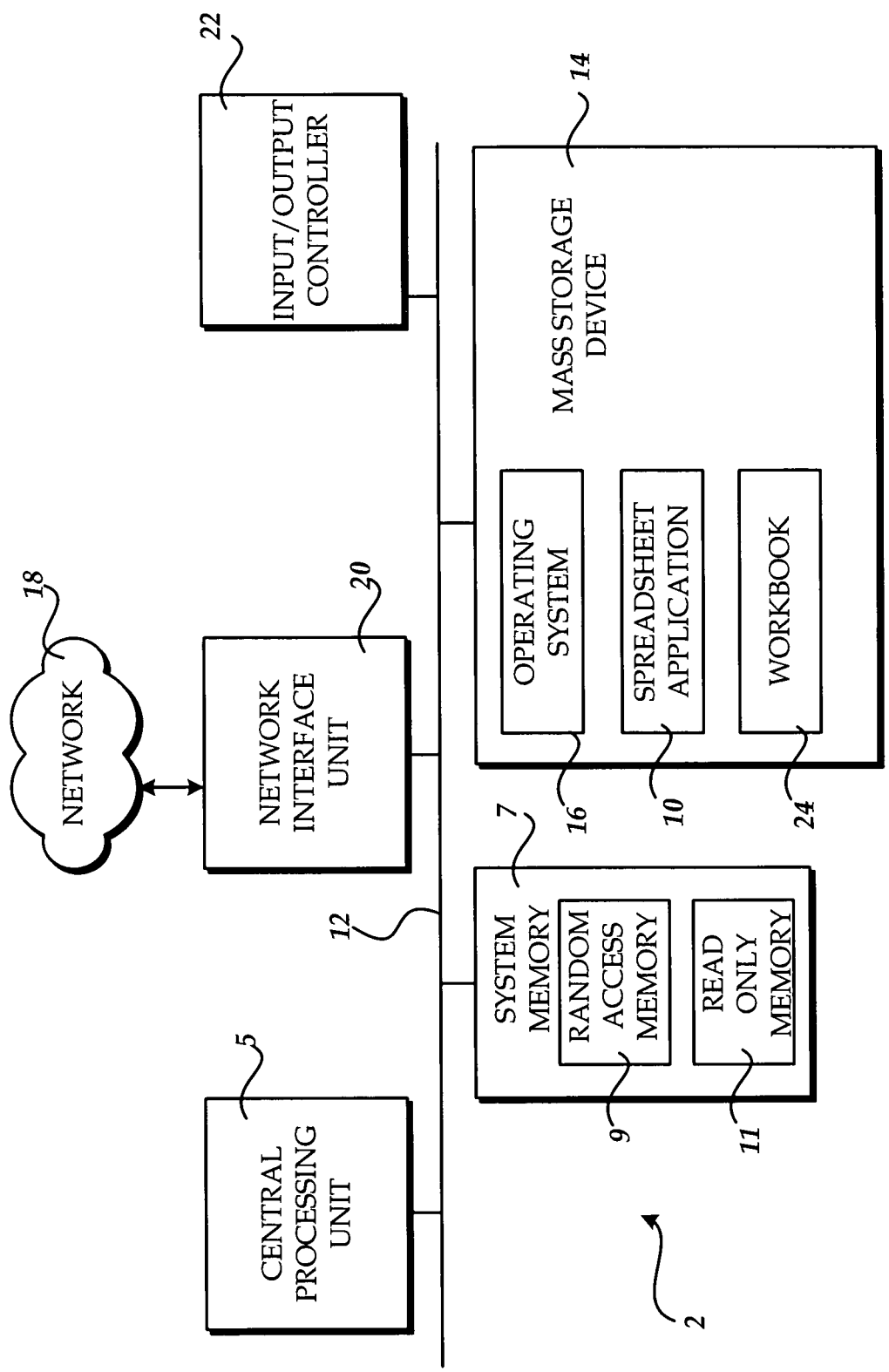
FIG. 1 is a block diagram representing an exemplary non-limiting computing system environment.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on server and personal computer systems, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

A number of program modules and data files may be stored in the mass storage device 14 and RAM 9 of the computer 2, including an operating system 16 suitable for controlling the operation of a networked personal computer. The mass storage device 14 and RAM 9 may also store one or more program modules. In particular, the mass storage device 14 and the RAM 9 may store a spreadsheet application program 10. Moreover, the spreadsheet application program 10 may be operative to generate, access, and modify, for example, a workbook 24.

According to one embodiment of the invention, the spreadsheet application program 10 comprises the EXCEL spreadsheet application program from MICROSOFT CORPORATION. It should be appreciated, however, that other spreadsheet application programs from other manufacturers may be utilized to embody the various aspects described or contemplated herein.

The workbook is a file that is created by a spreadsheet program that contains one or more worksheets (a worksheet may also be referred to herein as a "spreadsheet"). A worksheet is a single page organized into rows and columns within the spreadsheet program and appearing on screen. Through the use of these features, a user can create models of financial and numerical problems and solutions. Alternately, for example, a workbook may be created programmatically, e.g., if the file format is public, such as an extensible markup language (XML) file format.

A spreadsheet document may be displayed. A user of the computer may interact with a display of the spreadsheet. The user may also be permitted to request that the spreadsheet file be opened in the spreadsheet application program 10. In response to such a request, the spreadsheet application 10 will be launched and the spreadsheet file will be loaded by the spreadsheet application program 10.

Figure 2:
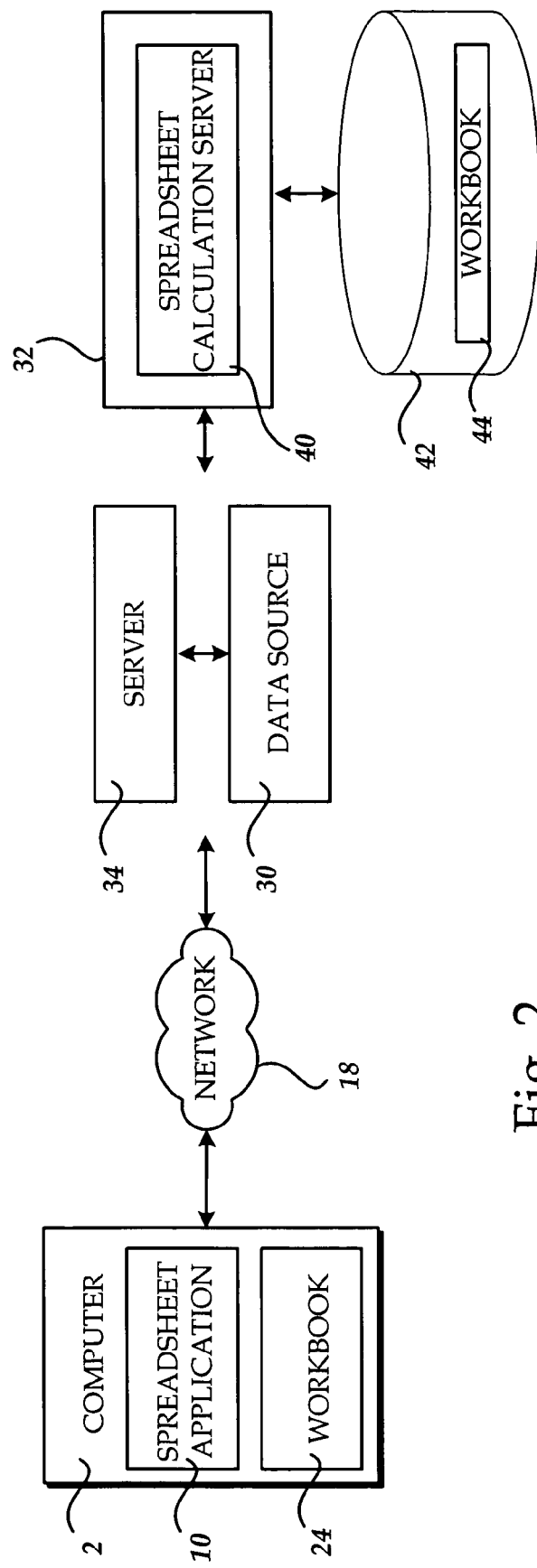
FIG. 2 is a block diagram representing an exemplary network environment.

Referring now to FIG. 2, a network architecture diagram will be described that illustrates an operating environment for the various embodiments of the invention. As shown in FIG. 2, the computer 2 is connected to a network 18. Also connected to the network 18 is a server 34. The server 34 comprises a server computer which may contain some or all the conventional computing components described above with respect to FIG. 1. The server 34 can receive and respond to requests for documents stored at or accessible to the server 34, e.g., at a data source 30, a database 42, or other storage device.

An interface may be provided to a user of the computer 2 to interact with a spreadsheet or workbook accessible via the network 34. A server application programming interface ("API") may be provided such that the API is operative to enable communication with a spreadsheet calculation server 32. The spreadsheet calculation server 32 is operative to execute a spreadsheet calculation server program 40. The spreadsheet calculation server program 40 comprises an executable program for retrieving and calculating spreadsheets, such as the workbook 44 stored in the database 42, for example.

In a workflow, when there is a human-intervention step, the user may use a spreadsheet application 10, but not necessarily a separate copy of the workbook 24. Sometimes there may be a separate copy (e.g., the server sends an email including the copy) and sometimes the user may use the application 10 to view the server workbook 44. Moreover, it is contemplated that the workbook 44 may reside anywhere, such as on a filesystem, and not in a database. It should be appreciated that in the embodiments of the invention described herein, the spreadsheet calculation server program 40 comprises a calculation server, such as the EXCEL CALCULATION SERVER program from MICROSOFT CORPORATION. However, other programs for calculating a spreadsheet on a server computer may be utilized. It should also be appreciated that the calculation server 32 may include many of the conventional hardware and software components discussed above with respect to FIG. 1.

A workflow comprises activities. Conventionally, each activity is strung together to create a workflow that is a sequential process through which actions occur. A spreadsheet has volatile data that may change over time. It is desirable to extend the workflow to expose spreadsheet calculation activity as part of the workflow process.

Figure 3:
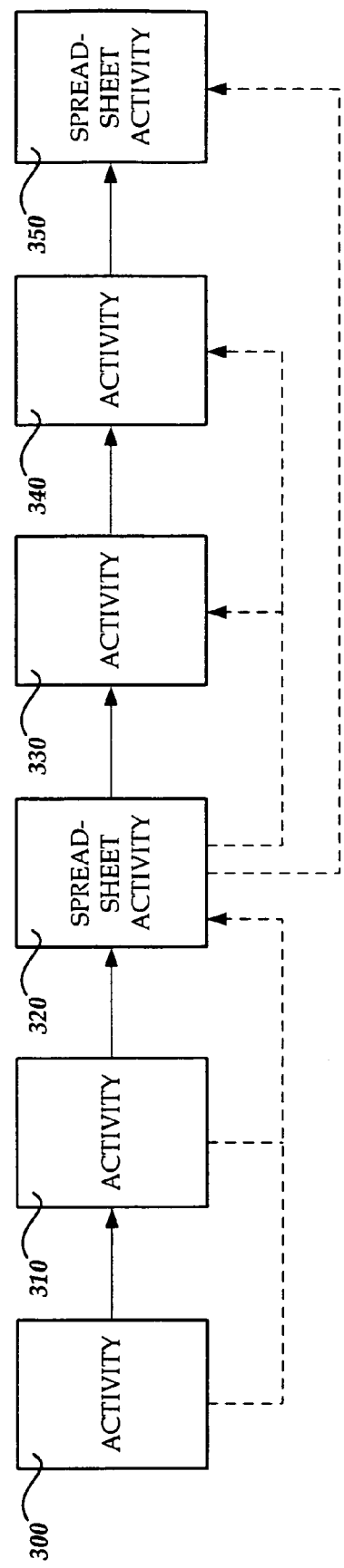
FIG. 3 is a diagram of an example workflow.

FIG. 3 is a diagram of an example workflow 3 that comprises activities 300, 310, 320, 330, 340, 350. A workflow may comprise user interface entry points, execution activity, and save activity, for example. Although six activities are shown, it is contemplated that any number of activities may be comprised within a workflow. An activity, e.g., activity 320, is provided that takes advantage of spreadsheet calculations, such as EXCEL calculations. The workflow progresses through activities 300 and 310, and then, for activity 320, calculation and extraction of values from a spreadsheet is performed. Thus, spreadsheet calculations are integrated into workflows without user intervention. For example, spreadsheet calculations are called as a step in an automated workflow. The spreadsheet file is recalculated during the workflow, at e.g., activity 320.

Values from previous activities in the workflow may be obtained and provided to the spreadsheet (e.g., cell values are set, modified, or adjusted). The spreadsheet may then be recalculated using these obtained values. As shown in FIG. 3, for example, values from activities 300 and/or 310 may be provided to activity 320, which uses these values in its spreadsheet calculation.

Moreover, values from the spreadsheet may be used in subsequent parts of the workflow. As shown in FIG. 3, for example, values determined at spreadsheet activity 320 may be provided to activities 330 and/or 340 for use in these activities. It is contemplated that any number of spreadsheet activities may be incorporated into a workflow, and that a first spreadsheet activity 320 may provide values to a second spreadsheet activity 350 or any other activity in the workflow. After a spreadsheet activity is calculated, or upon a trigger being activated or a condition or threshold being met, for example, the user may be notified (e.g., by email) or a software system may be notified. The notification may comprise content including a calculated workbook, a uniform resource locator (URL) of a workbook, a value of a cell that triggered the notification, and/or predetermined values. The notification process may itself be considered to be an activity. In such an embodiment, the notification activity may be triggered or otherwise activated or called based upon the results of a spreadsheet activity.

A notification may be set up based on values in spreadsheets cells meeting certain thresholds or conditions. Thus, a user may be notified, e.g., by email, or a software system may be notified, when a spreadsheet cell changes, for example. A spreadsheet may be refreshed and calculated at a particular time, a predetermined interval, or driven off a trigger, for example. The specific cells are evaluated against the pre-configured thresholds. If the thresholds are met, a notification is desirably triggered either in the form of an email, an instant message, or a call into a web service or an object model, a programmatic call, etc. The user receiving the email can take action knowing that the threshold has been met. Similarly, a software system receiving the notification may take action based on the notification. In the cases for which the threshold has not been met, there is no time wasted by the user as the operation was done by the system without user intervention. As an alternative to basing notification on one or more cell values, notification may be based on the fact that the workbook was calculated or may be based on the status of the workflow.

An example trigger type is the creation or editing of a spreadsheet file. For example, suppose a user submits a new expense report spreadsheet file into an expense report document library. As a result, a workflow fires, and a notification is sent to a manager, for example, if the expense report total is above some threshold.

Desirably, a user interface is provided so that a user may identify specific cells in the spreadsheet that he wants to track and the user may define the threshold and action to take (email, etc.). The user may also designate on which schedule or event to refresh and calculate the spreadsheet and evaluate the values being tracked.

For example, suppose a spreadsheet is provided that calculates warehouse inventory based on data coming from a back-end system and forecasting calculations in the workbook. Instead of coming into work every morning and loading the workbook, refreshing the data and checking the numbers, a user may be able to setup a system, such as EXCEL CALCULATION SERVER, to refresh the workbook every morning and check the inventory numbers against a predefined threshold (e.g., value or formula). During all the days that inventory is still in check, the user does not need to open the spreadsheet and spend the time to manually load, refresh, recalculate, and check the values. When the threshold is met, the user will receive an email notification from EXCEL CALCULATION SERVER. Alternatively, for example, an automatic inventory replenishing system will get a notification to restock. It is contemplated that notification may be provided when the workflow completes.

Figure 4:
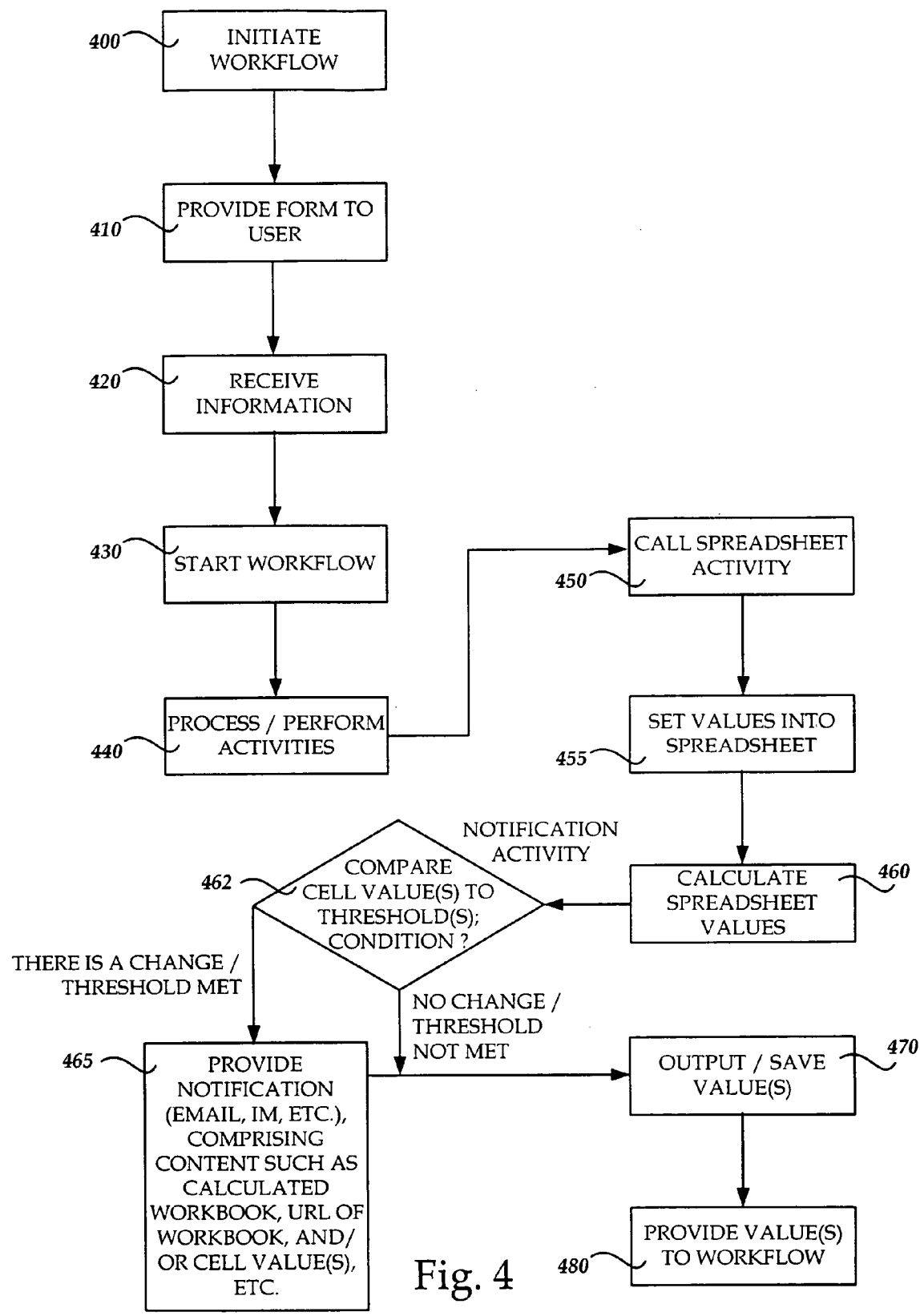
FIG. 4 is a flow diagram of an example workflow process.

FIG. 4 is a flow diagram of an example process. The workflow enables scheduling a calculation, as well as automatic calculation of a spreadsheet. A user interface may be provided to receive input parameters. Notification may also be provided. For example, notification may be provided based on a cell value in the spreadsheet. The notification may be initiated when the file changes, for example, and/or as scheduled. The spreadsheet is calculated, and output is checked for a condition, and based on the result, a notification is sent to a predetermined user or address, for example.

At step 400, a workflow is initiated, e.g., by a user, an application, or process. For example, the creation or editing of a spreadsheet may initiate the workflow. A form may be provided to the user at step 410 via a user interface for example. The form may be generated and provided locally, or at a server over a network for example, or partially locally and partially remotely. The user may enter information about the execution (e.g., parameters, values into a few cells, save path or options, output format, notification delivery method, etc.) at step 420. This information may be stored locally and/or remotely (e.g., at a server, over a network, etc.). The workflow is then started at step 430.

At step 440, activities in the workflow are processed and performed, e.g., in a sequential order. At step 450, a spreadsheet activity in the workflow is called. At step 455, values received from the user at step 420 or from preceding activities in the workflow, for example, are set into the spreadsheet. The workflow automatically calculates the spreadsheet values at step 460. The workflow activity may be calculated using an input parameter setting, a single scalar output value, and an optional save-as, along with a snapshot capability, for example. It is contemplated that processing and calculations, for example, may be performed locally and/or remotely (e.g., at a server, over a network, etc.). In an embodiment, the spreadsheet activity is a workflow activity provided by EXCEL CALCULATION SERVER that loads, parameterizes, and executes an EXCEL workbook, returning the result of the workbook to the workflow for further manipulation.

More particularly, the workflow activity may be loaded, parameterized, and executed, using a spreadsheet program, such as EXCEL CALCULATION SERVER. Thus, a workflow loads the activity, enables setting of input parameters, and calculates the spreadsheet including refreshing external data. The execution activity performs actions in the spreadsheet, when called, such as opening the spreadsheet, setting parameters and values, and calculating (refreshing or recalculating) the spreadsheet. Based on the values, it is determined if any notifications should be made. This may be implemented in a programmatic trigger, for example, or a workflow.

After the spreadsheet values are calculated, a notification activity may be begun. For example, it is determined at step 462 whether a threshold or condition has been met. For example, a cell value may be compared to a threshold value. It is noted that a threshold value may come from or be based upon a cell. If the threshold or condition has been met, then notification is provided at step 465. Notification is not provided if the threshold or condition has not been met. Alternately, for example, notification may be provided if an activity in the workflow has concluded, for example.

The activity can then expose an output value or can save the calculation at a predetermined location at step 470. Moreover, the results of the spreadsheet calculations may be provided to the workflow for further use and manipulation at step 480. It is noted that the determination of whether a threshold or condition has been met may be performed elsewhere in the example process, such as after step 470 or after step 480, for example. In an example embodiment, notification is provided when the workflow completes.

Figure 5:
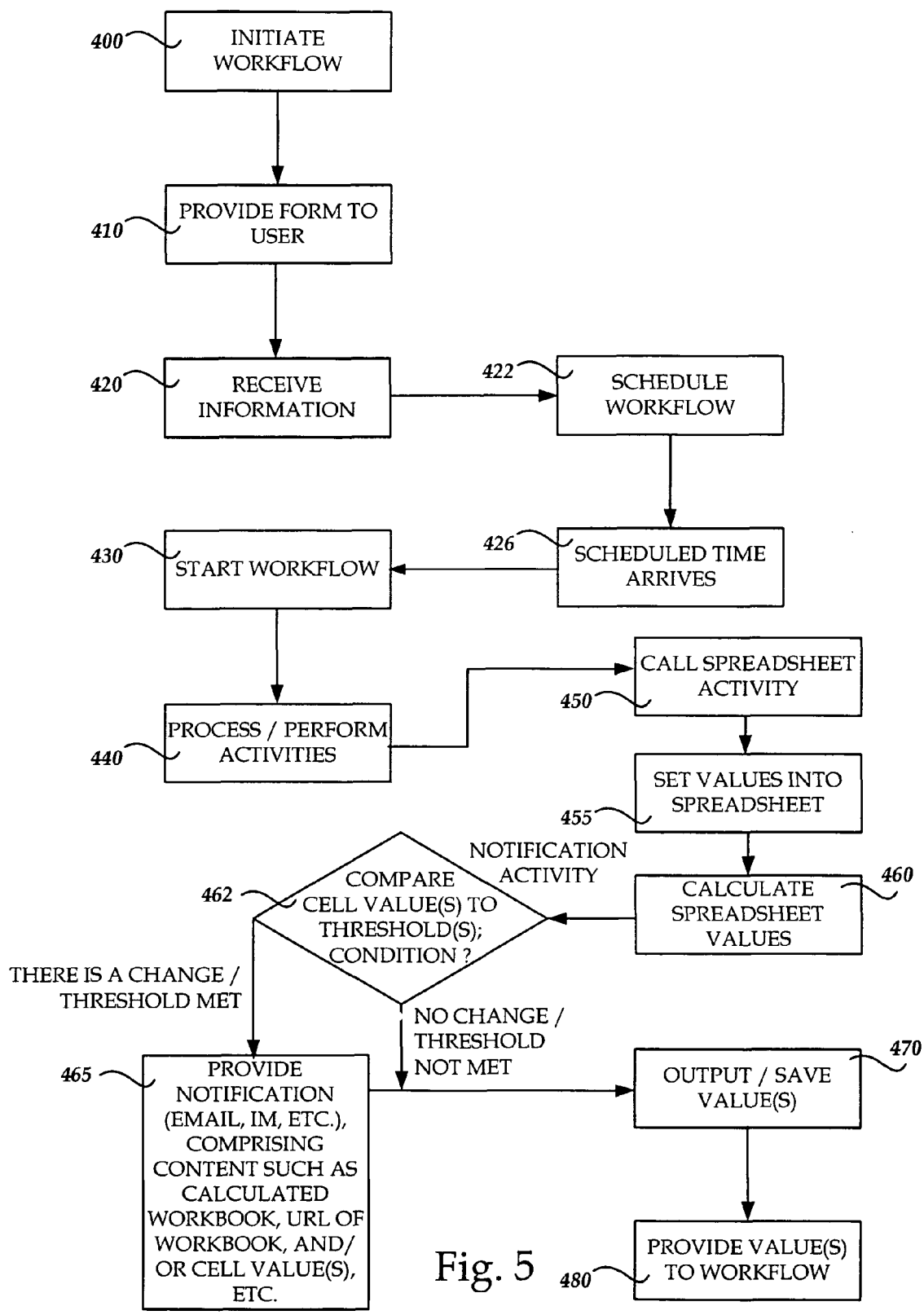
FIG. 5 is a flow diagram of another example workflow process.

FIG. 5 is a flow diagram of another example process. FIG. 5 contains elements similar to those described above with respect to FIG. 4. These elements are labeled identically and their description is omitted for brevity. In FIG. 5, rather than starting a workflow (step 430) as soon as information is received (step 420), the workflow is scheduled at step 422, e.g., to begin at a certain time or upon occurrence of a particular event. The scheduled time or event may be provided by a user, an application, or process, for example. The frequency may be selected (e.g., once, hourly, daily, weekly, etc.) beginning at a certain date/time, for example, When the scheduled time or event arrives, at step 426, then the workflow is started at step 430. In this manner, a workflow may be postponed or delayed until, for example, additional data is received for subsequent use in the workflow. The notification activity proceeds similar to that set forth above with respect to FIG. 4.

Figure 6:
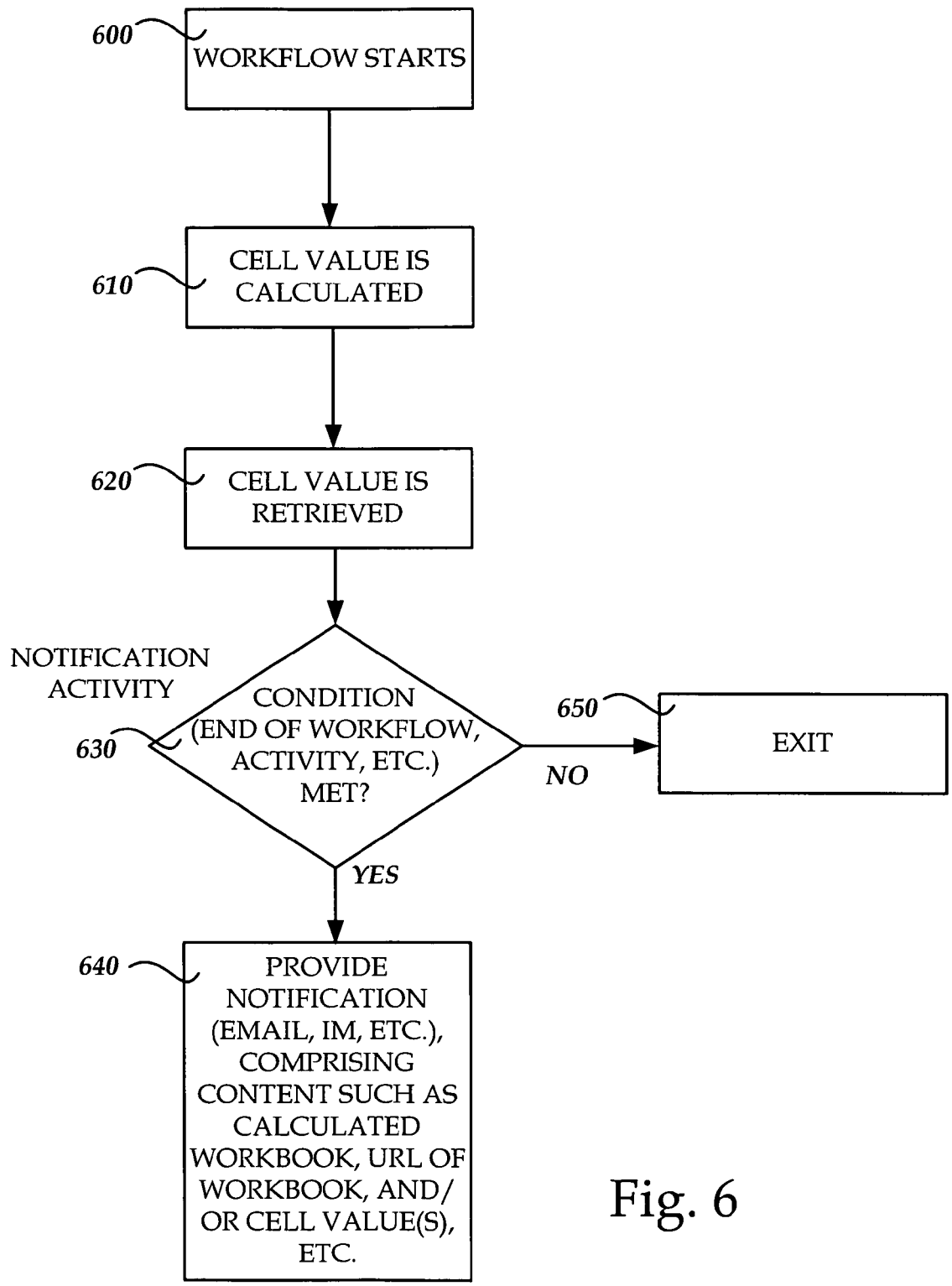
FIG. 6 is a flow diagram of another example workflow process.

FIG. 6 is a flow diagram of an example notification process. A workflow starts at step 600, pursuant to a scheduled event, for example. At step 610, a cell value in the spreadsheet is calculated and then retrieved at step 620. For example, an EXCEL CALCULATION SERVER may calculate and retrieve a cell value. A notification activity may then begin. It is determined at step 630 whether a condition or threshold has been met based on the retrieve cell value. If so, then notification is provided at step 640. If the condition or threshold has not been met, then notification is not provided at step 650.

In an example embodiment, a calculation is performed and the result is saved. Assume a user would like a complex model calculated with specific values, and that such a model would take a long time to calculate, tying up the client machine. The user can manually initiate the calculation workflow. A form is provided, where she parameterizes a few cells and sets the result file name, and starts the workflow. The user may also designate in the form whether or not she wants a notification. When the file is ready, an email notification is sent to the user (the file can be attached or a URL can be sent), or the values of the cells that triggered the notification may be attached to the notification, for example.

In another example embodiment, a calculation may be scheduled, e.g., for subsequent offline view. For example, suppose a user wants to calculate a spreadsheet workbook every morning to reflect last night's inventory numbers. The spreadsheet workbook may be sent in email to the user. The user schedules a calculation workflow to start on this file every morning at 4 am. Every morning, an updated version of the spreadsheet workbook is sent in email to the user. This can either be a snapshot of the spreadsheet workbook or the complete spreadsheet workbook depending on the settings.

A workflow can be built to open a spreadsheet, read an output value, and update a property in the file's document library, for example. Suppose a document library contains a team's expense reports and all the reports have the total expense in cell Sheet1 :B2. The library has a "Total Expense" column. Whenever a new expense report file is dropped in the library, a workflow fires, reads cell Sheet1 :B2, and updates the "Total Expense" property of the file, so that the value shows up in document library (doclib) views.

An example involving cell notification is provided. Suppose a user needs to audit any submitted expense report over $1000. To achieve this, he navigates to the doclib where the expense application drops new expense reports and selects "Modify settings and columns", and in the following page he clicks "Add a workflow". The user associates a "Cell notification" workflow with the doclib, to be initiated every time a document changes in the doclib. The user adds the "expense total" cell name, the condition (>) and value (1000), and his email alias as parameters. Now, every time an expense report lands in the doclib, the workflow kicks in, the condition is checked, and the user receives an email if the condition is met. Cell notification may be initiated based on a change, or as scheduled, for example.

There are multiple implementation techniques, e.g., an appropriate API, tool kit, driver code, operating system, control, standalone or downloadable software object, etc. which enables applications and services to use the systems and methods for providing and enabling the functionality. Various implementations described herein may have aspects that are wholly in hardware, partly in hardware and partly in software, as well as in software.

As mentioned above, while exemplary embodiments have been described in connection with various computing devices and network architectures, the underlying concepts may be applied to any computing device or system that uses workflows. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments.

As mentioned, the various techniques described herein may be implemented in connection with hardware or software or, where appropriate, with a combination of both. Thus, the methods and apparatus, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the aspects described herein are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality. Additionally, any storage techniques may invariably be a combination of hardware and software.

While preferred embodiments have been described, it is to be understood that other similar embodiments may be used or modifications and additions may be made to the described embodiment for performing the same function without deviating therefrom. It should be emphasized that a variety of computer platforms, including handheld device operating systems and other application specific operating systems are contemplated, especially as the number of wireless networked devices continues to proliferate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
responsive to a generation of a first spreadsheet file:
    designating a threshold value of a cell in the first spreadsheet file;
    designating a schedule to refresh and recalculate the first spreadsheet file;
    initiating a first automated workflow process;
    initiating a second automated workflow process; and
    responsive to receiving an output value from the first automated workflow process, executing the second automated workflow process;
obtaining, without user intervention, based on the schedule, a first value of the cell in the first spreadsheet file at a first workflow activity of the first automated workflow process executing on a computing device and providing the first value to a second workflow activity of the first automated workflow process;
calling the second workflow activity by the first automated workflow process executing on the comprising device;
responsive to calling the second workflow activity by the first automated workflow process executing on the computing device, the second workflow activity, without user intervention:
    opening a second spreadsheet file,
    entering the first value into the second spreadsheet file,
    recalculating the second spreadsheet file to generate a second value in the second spreadsheet file using the first value, and
    providing the second value to a third workflow activity;
determining, at the third workflow activity of the first automated workflow process executing on the computing device, that the threshold value has been met based on the second value; and
responsive to determining that the threshold value has been met, initiating a fourth workflow activity of the fist automated workflow process that exposes the second value as the output value and transmits from the computing device to the second automated workflow process a cell-based notification comprising the output value.

2. The method of claim 1, wherein determining that the threshold value has been met based on the second value comprises determining that the second value matches the threshold value.

3. The method of claim 2, wherein determining that the threshold value has been met based on the second value comprises comparing the second value to the threshold value prior to transmitting the cell-based notification to the second automated workflow process.

4. The method of claim 1, wherein determining that the threshold value has been met based on the second value further comprises detecting a termination of a fifth workflow activity.

5. The method of claim 1, further comprising updating a property of the first spreadsheet file with the first value.

6. A method comprising:
a processor; and
a memory coupled to the processor, the memory having stored thereon executable instructions that when executed by the processor cause the processor to effectuate operations comprising:
    responsive to a generation of a first spreadsheet file:

designating a threshold value of a cell in the first
spreadsheet file;
designating a schedule to refresh and recalculate the
first spreadsheet file;
initiating a first automated workflow process;
initiating a second automated workflow process; and
responsive to receiving an output value from the first
automated workflow process, executing the second automated workflow process;
obtaining without user intervention based on the schedule a first value of the cell in the first spreadsheet file at a first workflow activity of the first automated workflow process executing on the server and providing the first value to a second workflow activity of the first automated workflow process;
calling the second workflow activity by the first automated workflow process executing on the server;
responsive to calling the second workflow activity by the first automated workflow process executing on the server, the second workflow activity, without user intervention:
opening a second spreadsheet file,
entering the first value into the second spreadsheet file,
recalculating the second spreadsheet file to generate a second value in the second spreadsheet file using the first value, and
providing the second value to a third workflow activity;
determining, at the third workflow activity of the automated workflow process executing on the server, that the threshold value has been met based the second value; and
responsive to determining that the threshold value has been met, initiating a fourth workflow activity of the first automated workflow process that exposes the second value as the output value and transmits a cell-based notification from the server to the second automated workflow process comprising the output value.

7. The server of claim 6, wherein determining that the threshold value has been met based the second value comprises determining that the second value matches the threshold.

8. The server of claim 6, wherein determining that the threshold value has been met based on the second value further comprises detecting a termination of a fifth workflow activity.

9. The server of claim 6, wherein obtaining the first value from the first spreadsheet file comprises obtaining the first value from a cell in the first spreadsheet file.

10. The server of claim 6, wherein the operations further comprise updating a property of the first spreadsheet file with the first value.

11. A machine-readable storage medium bearing computer executable instructions, wherein the instructions comprise instructions that when executed by a processor cause the processor to implement the steps of:

responsive to a generation of a first spreadsheet file:
designating a threshold value of a cell in the first spreadsheet file,
designating a schedule to refresh and recalculate the first spreadsheet file,
initiating a first automated workflow process,
initiating a second automated workflow process, and
responsive to receiving an output value from the first automated workflow process executing the second automated workflow process;
obtaining, without user intervention, based on the schedule, a first value of the cell in the first spreadsheet file at a first workflow activity of the first automated workflow process executing on the computing system and providing, based on the schedule, the first value to a second workflow activity of the first automated workflow process;
calling the second workflow activity by the first automated workflow process executing on the computing system;
responsive to calling the second workflow activity by the first automated workflow process executing on the computing system the second workflow activity, without user intervention:
opening a second spreadsheet file,
entering the first value into the second spreadsheet file,
recalculating the second spreadsheet file to generate a second value in the second spreadsheet file using the first value, and
providing the second value to a third workflow activity;
determining, at the third workflow activity of the automated workflow process executing on the computing system, that the threshold value has been met based the second value; and
responsive to determining that the threshold value has been met, initiating a fourth workflow activity of the first automated workflow process that exposes the second value.

12. The machine-readable storage medium of claim 11, wherein determining that the threshold value has been met based on the second value comprises determining that the second value matches the threshold value.

13. The machine-readable storage medium of claim 11, wherein determining that the threshold value has been met based on the second value comprises comparing the second value to the threshold value prior to transmitting the cell-based notification to the second automated workflow process.

14. The machine-readable storage medium of claim 11, wherein determining that the threshold value has been met based on the second value further comprises detecting a termination of a fifth workflow activity.

15. The machine-readable storage medium of claim 11, wherein the instructions further comprise updating a property of the first spreadsheet file with the first value.

* * * * *